United States Patent [19]
Sullivan

[11] Patent Number: 5,511,961
[45] Date of Patent: Apr. 30, 1996

[54] MACHINE FOR MANUFACTURING COTTON CANDY BALLS

[76] Inventor: John T. Sullivan, 3910 Madison St., Hyattsville, Md. 20781

[21] Appl. No.: 269,220

[22] Filed: Jun. 30, 1994

[51] Int. Cl.[6] .................................................. B29C 67/02
[52] U.S. Cl. .................................... 425/9; 425/436 R
[58] Field of Search ................ 425/9, 8, 7, 444, 425/436 R, 436 RM, 274; 264/6, 11, 8

[56] References Cited

U.S. PATENT DOCUMENTS

| | | | |
|---|---|---|---|
| 1,489,342 | 4/1924 | Brent | 425/9 |
| 1,541,378 | 6/1925 | Parcell | 425/9 |
| 1,806,111 | 5/1931 | Moad | 425/9 |
| 3,036,532 | 5/1962 | Bowe | 425/9 |
| 3,070,045 | 12/1962 | Bowe | 425/9 |
| 3,203,365 | 8/1965 | Bowe et al. | 425/9 |
| 3,856,443 | 12/1974 | Salvi | 425/9 |
| 4,293,292 | 10/1981 | Israel | 425/9 |
| 4,360,328 | 11/1982 | Kassabrian | 425/9 |
| 4,793,782 | 12/1988 | Sullivan | 425/7 |
| 5,346,377 | 9/1994 | Bogue et al. | 425/9 |

Primary Examiner—James C. Housel
Assistant Examiner—Hien Tran
Attorney, Agent, or Firm—Diller, Ramik & Wight

[57] ABSTRACT

A machine for manufacturing cotton candy balls includes a plurality of suspended rotatable spindles in surrounding external relationship to a spinning or flossing head and in internal relationship to a tub. As liquid sugar/floss is emitted from slots of the spinning head and impinges upon the rotating spindles, a cotton candy ball is formed on each spindle. An ejector is associated with each spindle and descends vertically to simultaneously downwardly eject the cotton candy balls.

53 Claims, 5 Drawing Sheets

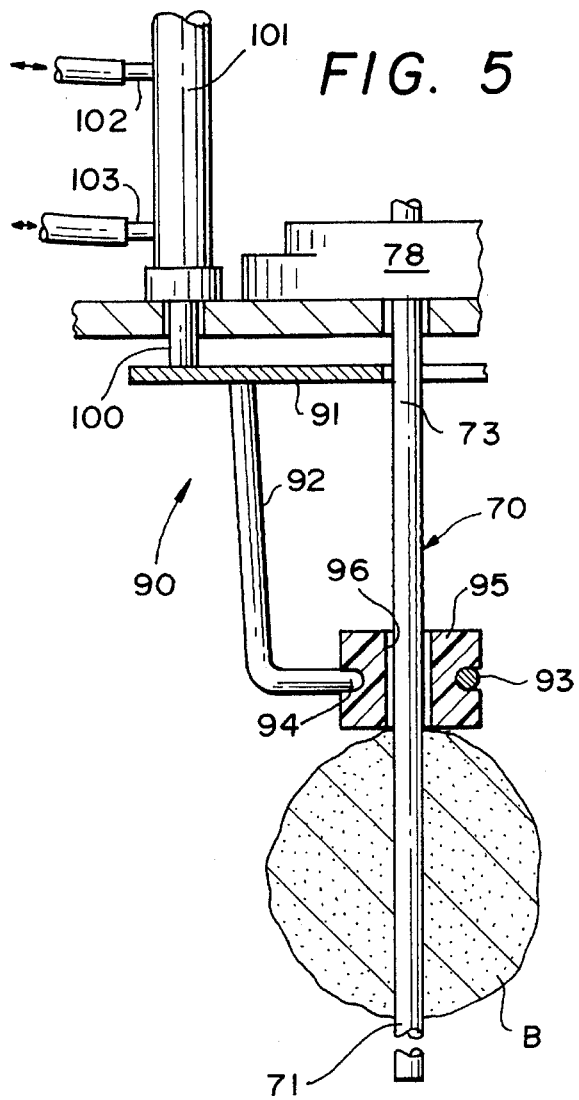
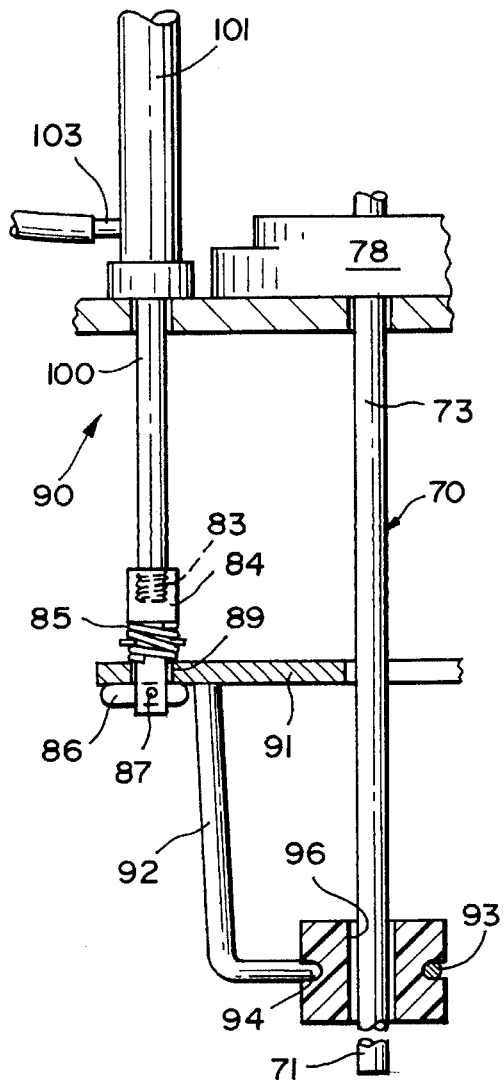
FIG. 5
FIG. 6

5,511,961

MACHINE FOR MANUFACTURING COTTON CANDY BALLS

BACKGROUND OF THE INVENTION

In the late 1800's and early 1900's, the United States Patent Office granted many patents for machines which produced cotton candy by melting granular sugar and ejecting the same from spinning heads upon an interior surface of a tub from which the cotton candy or floss was picked-up on wooden sticks. Typical of such patents include the patents to Moad (U.S. Pat. No. 1,806,111) granted on May 19, 1931; Parcell (U.S. Pat. No. 1,541,378) granted on Jun. 9, 1925 and Brent (U.S. Pat. No. 1,489,342) granted on Apr. 8, 1924. Each of these patents includes a single heating chamber and a single slotted spinning head or flossing head which is limited to manufacturing cotton candy of a single color. In the 1960's, U.S. Pat. Nos. 3,036,532 and 3,070,045 were granted to Bowe on May 29, 1962 and Dec. 25, 1962, respectively. These patents included twin or tandem spinning or flossing heads to allow the manufacture of cotton candy of two different colors, again by the sugar being melted and spun from the spinning heads as a floss against the interior surface of a tub from which it was gathered by accumulation upon a paper cone. The present patentee was granted U.S. Pat. No. 4,793,782 on Dec. 27, 1988 for a like two-colored cotton candy machine.

Since cotton candy was manufactured in the latter fashion over the past 100 years, cotton candy lovers worldwide were experiencing sticky fingers tearing off "bite" size portion of cotton candy from the tub spun "wads." In recent years, a few cotton candy producers attempted crushing the naturally fluffy candy into flat bricks, but this undesirably removed the fluffiness of the candy for easy of packaging. Therefore, the cotton candy trade has seen relatively few innovations over the past century and for the most part little has been done to manufacture cotton candy rapidly so that it can be packaged, purchased and eaten immediately, as opposed to present day pre-packaging of large cotton candy wads which are stored for numerable days or weeks prior to sale.

Quite simply, present day machines for producing cotton candy upon paper cones are labor-intensive and high speed cotton candy machines for manufacturing on-the-spot fresh cotton candy readily and immediately available for purchase and ingestion are essentially unknown.

SUMMARY OF THE INVENTION

In keeping with the foregoing, a primary object of the present invention is to provide a novel machine for manufacturing "bite" size cotton candy balls on an extremely high speed basis absent labor intensiveness. Because the machine of the present invention is relatively high speed, as compared to conventional cotton candy spinning machines, a single machine at a single location can generate cotton candy balls virtually faster than the same can be consumed, but even at high demands an additional machine can virtually assure the continuous production of fresh cotton candy balls upon demand. Furthermore, since the cotton candy machines of the present invention are relatively high speed, the cotton candy balls can be manufactured and packaged in plastic bags essentially in hours before they are sold, thereby, eliminating extended warehousing of conventional plastic packaged cotton candy "wads," as is presently practiced in the cot:ton candy manufacturing industry. Therefore, whether the machine of the present invention is used "on location" or as part of an overall central manufacturing, packaging and shipping facility, the end product is delivered to the purchaser in the least amount of time absent undesirable long-term warehousing, thus achieving a "fresh" and highly delectable cotton candy product.

The machine of the present invention utilizes a spinning head or flossing head of the type conventionally used for years in the industry, together with an associated tub. However, in accordance with the present invention, the machine includes a plurality of spindles which are in surrounding relationship to the spinning or flossing head and are positioned such that the stream of liquid sugar exiting discharge slots of the spinning head impinges upon, adheres to and crystallizes upon the spindles as the spindles are rotated. In the manner of a few seconds, each rotating spindle has formed thereupon a ball of cotton candy which is subsequently ejected .and discharged from the machine, followed by the subsequent formation of an individual cotton ball upon each rotating spindle. This process is repeated ad infinitum and during each cycle of the machine, a plurality of cotton balls are formed, ejected, packaged and sold or temporarily stored for virtually immediately subsequent sale. In this manner, each cotton candy ball can be regulated in size by simply selectively determining the time each rotation spindle is allowed to accumulate cotton candy floss thereupon. Preferably, each cotton candy ball is approximately the size of a tennis ball which is about "bite" size, when one recognizes that the cotton candy is extremely compressible and reduces virtually instantaneously from high volume cotton candy "floss" to minuscule volume liquid when placed in the mouth of a consumer. Such "bite" size cotton candy balls are, therefore, exceedingly efficient not only from a manufacturing standpoint, but also from an eating standpoint and, of course, packaging is also simplified since it is simpler to place a plurality of small diametered cotton candy balls into a plastic bag than a huge cotton candy "wad" into a like size plastic bag. Thus, the cotton candy machine of the present invention produces a superior product at a high production rate in the absence of any degradation of taste or postpackaging problems, such as excessive warehousing/storage.

The high speed production rate of the cotton candy ball manufacturing machine is augmented by suspending the spindles relative to the spinning or flossing head and ejecting each formed cotton candy ball in a vertical downward direction while each spindle is rotating. The cotton candy balls thereafter simply drop by gravity from the spindles and can be subsequently discharged from the machine for eventual packaging.

The machine also includes a relatively large reservoir for the granular sugar and a detection mechanism for assuring an adequate supply of the sugar in the heating chamber. An optical sugar height level detector senses or detects the level of sugar in the heating chamber and controls an electrically actuated feed screw or auger to supply sugar to the heating chamber on an as-needed basis. Accordingly, all an operator need do is supply a reservoir with sufficient sugar and a bagging machine with sufficient bags and the cotton candy ball manufacturing machine does the rest in a highly efficient, highly sanitary and highly inexpensive manner.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 5 is a fragmentary enlarged sectional view of one of the spindles and its associated ejecting mechanism, and illustrates an ejector of the ejecting mechanism prior to cotton candy ball ejection.

FIG. 6 is a view similar to FIG. 5, and illustrates the cotton candy ball being ejected in a quick connect/disconnect coupling between an ejector fluid cylinder rod and an associated ejector plate.

DESCRIPTION OF THE PREFERRED EMBODIMENT

Figure 1:
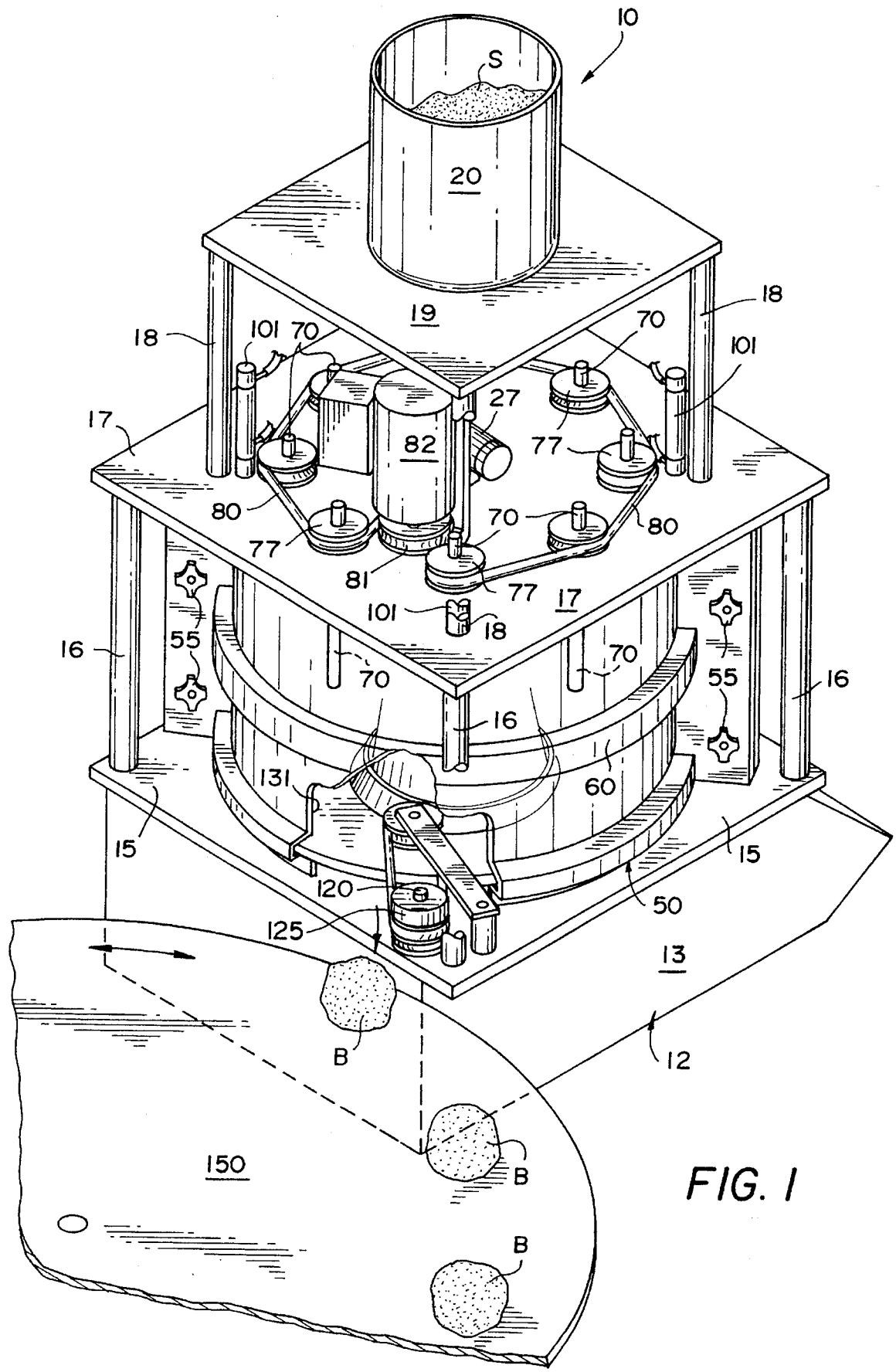
FIG. 1 is a perspective view of a novel machine for manufacturing cotton candy balls in accordance with the present invention, and illustrates a sugar reservoir, a motor for rotating a plurality of vertically suspended spindles, a tub and a discharge mechanism for discharging cotton candy balls upon a discharge table.

A novel machine for manufacturing cotton candy balls B is generally designated by the reference numeral 10 (FIGS. 1 through 4).

Figure 2:
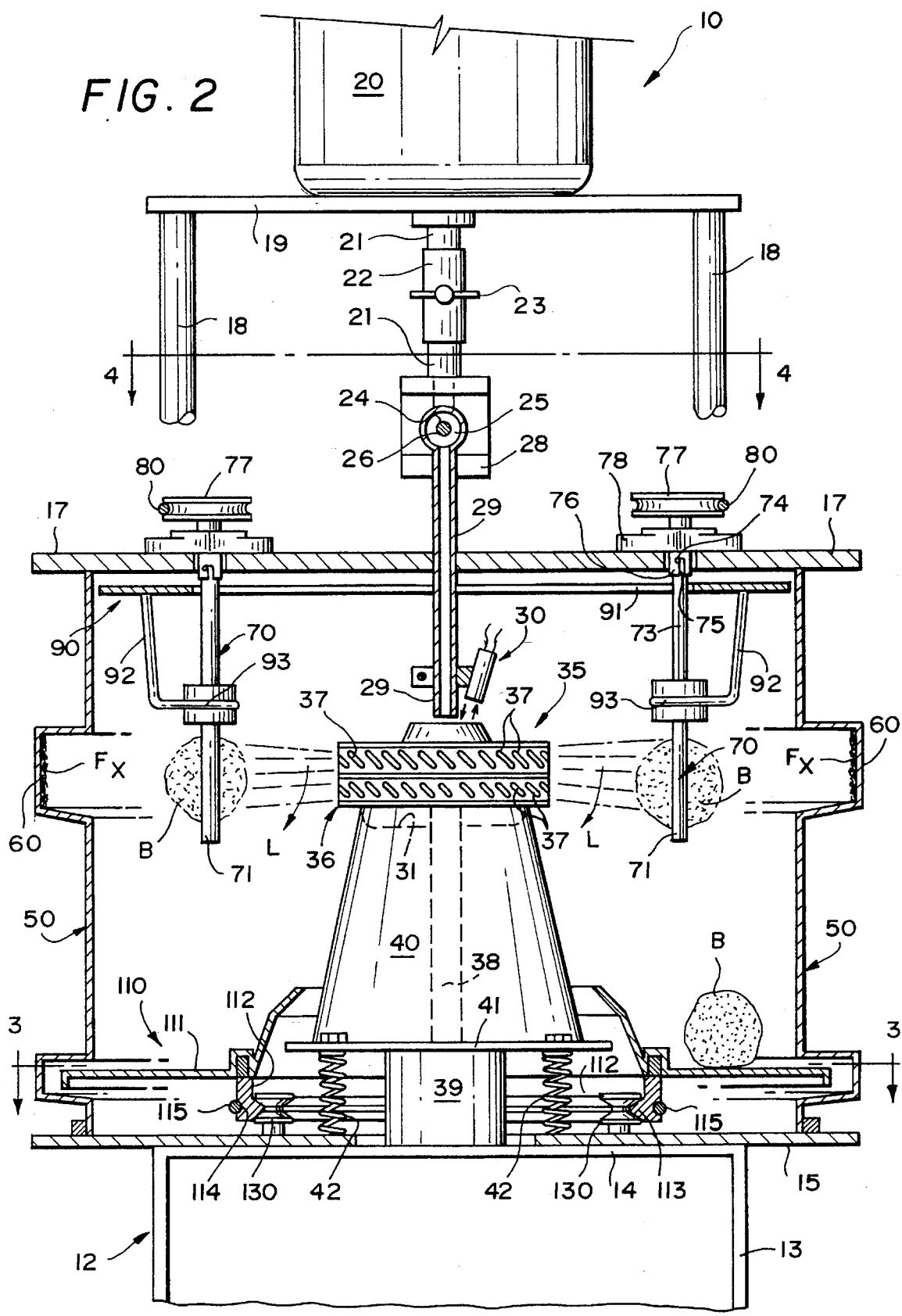
FIG. 2 is a cross-sectional view taken generally along line 2—2 of FIG. 4 and illustrates details of the rotating spindles, a spinning or flossing head, a sugar feed screw, a sugar level detector and a cotton candy ball discharge plate.

The machine 10 includes a housing frame or stand 12 (FIGS. 1 and 2) which includes a generally rectangular base 13 upon an upper wall 14 of which is supported a lower plate or base plate 15. Secured to and rising from each corner (unnumbered) of the base plate 15 is a support post 16 (FIG. 1). A middle plate 17 (FIGS. 1 and 2) is connected to upper ends (unnumbered) of the support posts 16 and in turn supports at each of its corners another set of support posts 18 (FIGS. 1 and 4) which in turn are fixed to and support at upper ends thereof a top plate 19. A container or reservoir 20 for granular or granulated sugar S is supported atop the top plate 19 and includes a discharge pipe 21 (FIGS. 2 and 4) through which sugar flows under the influence of gravity. A manually operated open and close valve 22 operated by a handle 23 is located in the sugar discharge pipe 21 and functions to cut on or cut off sugar flow from the sugar reservoir 20. The sugar discharge pipe 21 is in fluid communication with a horizontally disposed cylinder 24 in which is housed a sugar feed screw or auger 25. The sugar feed screw or auger 25 includes a shaft 26 (FIG. 4) of an electric motor 27 supported by a housing 28 from and relative to the sugar discharge pipe 21. The electric motor 27 is preferably a stepping motor and is connected to a suitable source of electrical energy (not shown) a conventional optical detector or detecting means 30 (FIG. 2) detects the height of sugar within a heating chamber 31 of a conventional spinning head assembly or floss head assembly 35 which can be constructed in accordance with patents earlier described herein and to which reference can be made for details of construction. However, the spinning head assembly 35 includes a conventional spinning head or floss head 36 which in this embodiment includes two pair of angular discharge slots 37. The floss head 36 is supported by a shaft 38 being rotated by an electric motor 39 with the latter structures being supported by a hollow conical support 40 having a lower base plate 41 supported by vibration damping and supporting springs 42. During operation of the machine 10, when the manual handle 23 is moved to its open position, granular sugar descends from the sugar reservoir 20 through the sugar discharge pipe 21 and into the cylinder 24 discharging therefrom through a sugar fill pipe or nozzle 29 into the heating chamber 31 on the basis of demand as indicated by the detector 30. The heating chamber 31 includes conventional heating bands (not shown) associated with the spinning head 36 which transforms the granulated sugar S into liquid which is ejected from the angular slots 37 in an extremely fine liquid stream which is generally designated by the reference number L (FIG. 2).

Figure 3:
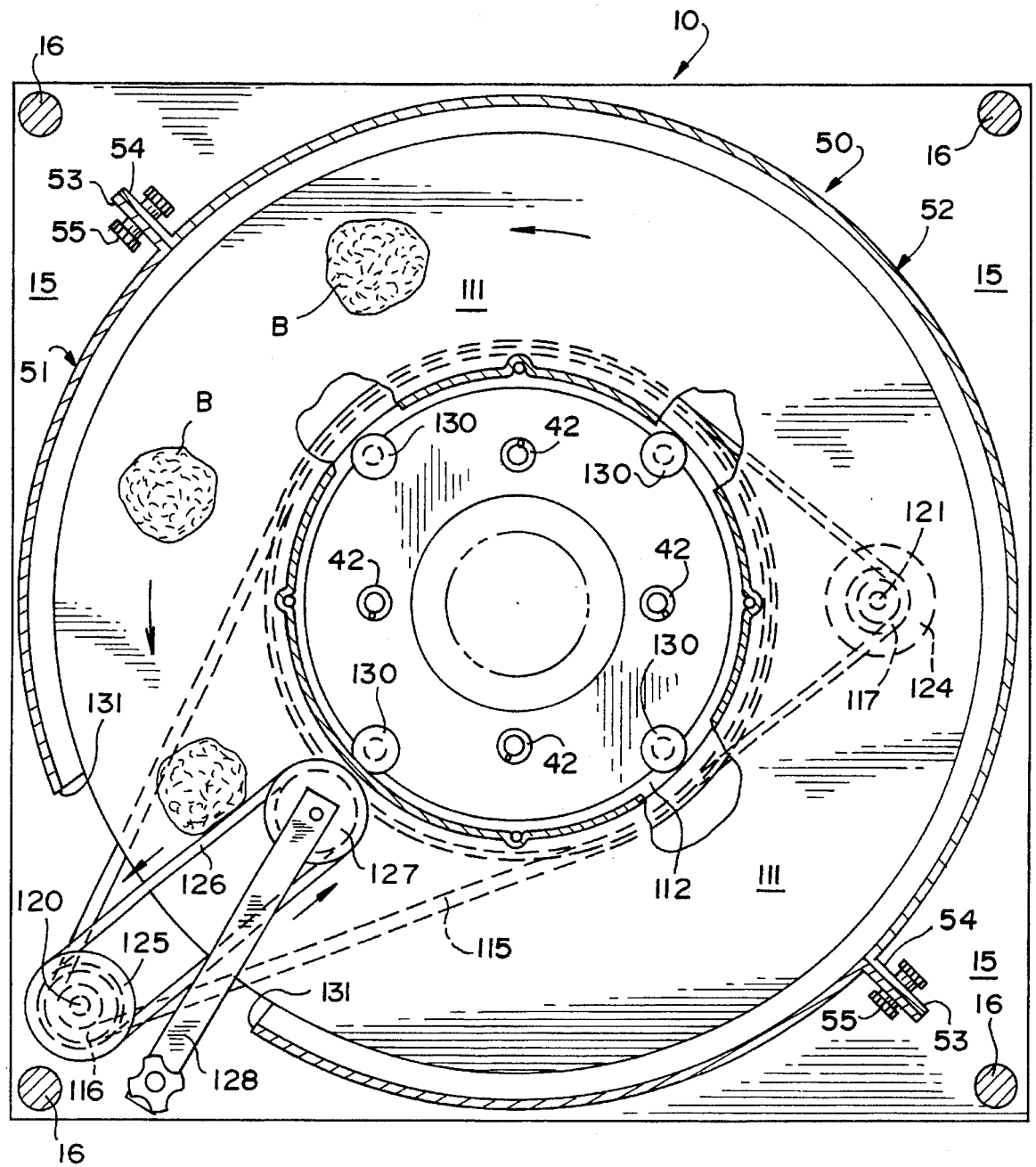
FIG. 3 is a cross-sectional view taken generally along line 3—3 of FIG. 2, and illustrates a drive mechanism for the discharge plate and a tub or reservoir formed of two halves united along a diametrically parting line.

The entire floss head assembly 35 is located within a stationary tub 50 formed of two tub halves or tub bodies 51, 52 (FIG. 3) having respective radial flanges 53 and 54 connected together by conventional threaded fasteners 55 (FIG. 3). The stationary tub 50 includes an outwardly projecting enlarged peripheral or circumferential channel 60 which serves as a reservoir receiving and collecting excess floss Fx in a manner to be described immediately hereinafter.

Figure 4:
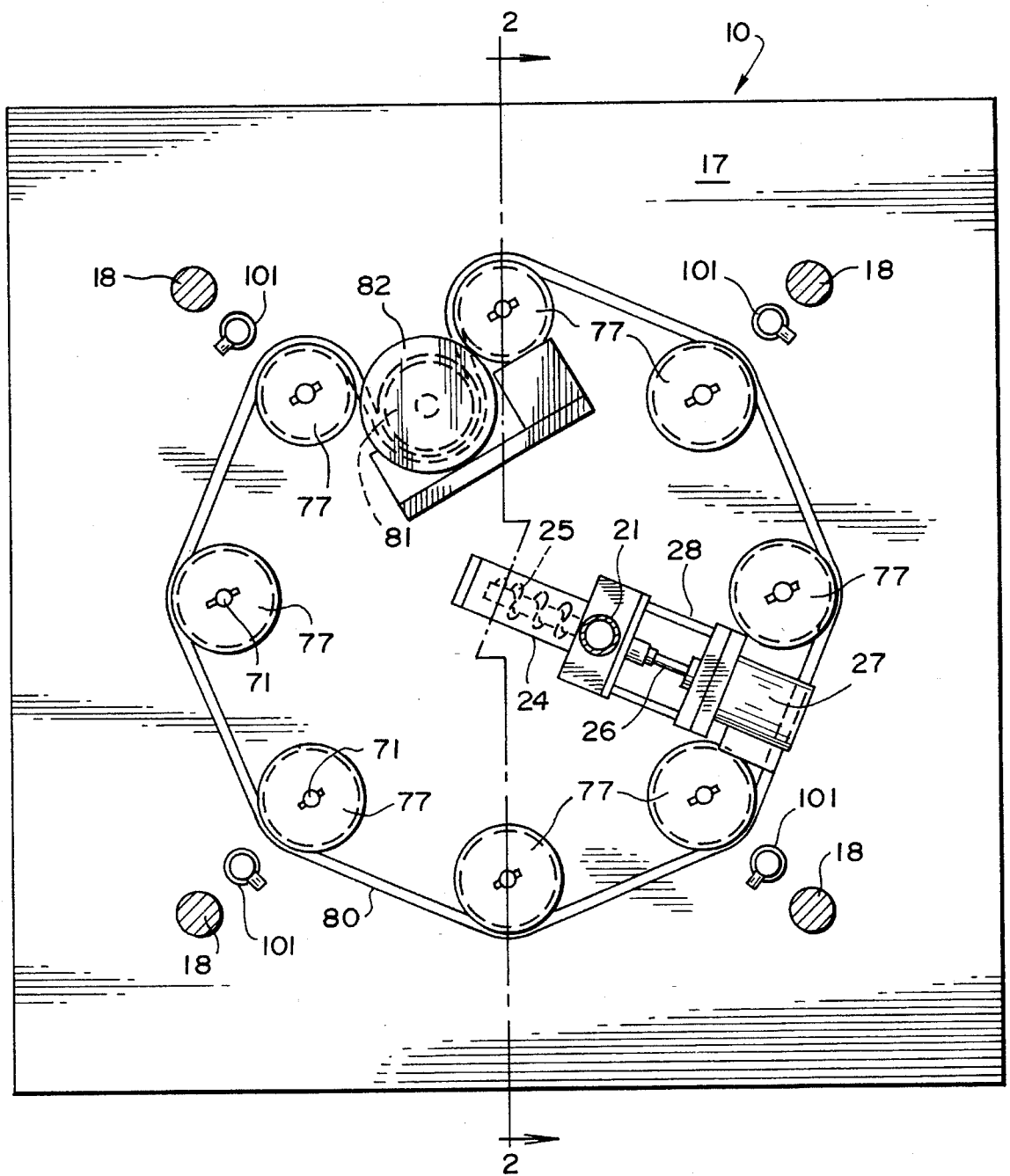
FIG. 4 is a cross-sectional view taken generally along line 4—4 of FIG. 2, and illustrates a drive mechanism for rotating the spindles and cylinders for the ejecting mechanism.

Eight spindle means or spindles 70 have axes (unnumbered) in a generally vertical plane and lower terminal end portions or ends 71 which project slightly below the channel 60. The spindles are in parallel relationship to each other, are equally spaced from the spinning or flossing head 36 and are equally spaced from each other, as is readily apparent in FIGS. 1 and 4 of the drawings. Each spindle 70 includes an upper terminal end portion or end 73 carrying a radially outwardly directed pin 74 which can be locked in or removed from a bayonet slot 75 of a sleeve 76 carrying a drive pulley 77 mounted for rotation in a bracket 78 fixed to the top of the middle plate 17. A pulley belt 80 functions as drive means for the pulleys 77 by being entrained relative thereto and about a drive pulley 81 of a variable speed electric motor 82 (FIGS. 1 and 4). As the motor 82 is energized and the speed varied in a conventional manner, the pulley 81 rotates the belt 80 which in turn rotates the pulleys 77 to rotate the spindles 70 at a desired speed relative to the speed of rotation of the spinning head 36, such that the liquid sugar L will impinge upon, adhere to and form itself into the cotton candy balls B, as is best illustrated in FIG. 2 of the drawings. Obviously, the air currents caused by the rotating spinning head 36 and static electricity assist for the most part in assuring that streams of liquid sugar or floss L impinge upon and adhere to the spindles 70 to form the cotton candy balls B but, as noted earlier, any excess floss Fx which passes beyond the spindles 70 will accumulate within the peripheral or cylindrical channel 60 for subsequent removal, as will be described more fully hereinafter.

Ejecting means or ejector means 90 is provided for ejecting each of the cotton candy balls B from its associated spindle 70. The ejecting means 90 includes an ejecting plate 91 of a generally annular configuration which is positioned adjacent and parallel to the middle plate 17 (FIG. 2). The ejecting plate 91 carries eight ejector support arms 92, each having a generally circular end portion 93 which is snapped-fit in a groove 94 (FIGS. 5 and 6) of an annular ejector 95 having a generally axial bore 96 somewhat larger than the exterior diameter of each spindle 70. Preferably, the generally circular end portion 93 of each ejector support arm 92 circumscribes an arc of just beyond 180 degrees so that each ejector 95 can be snap-secured thereto and removed therefrom. A piston rod 100 of each of four cylinders 101 is connected to the ejecting plate 91 at four equally spaced positions adjacent the supporting post 18, as is best illustrated in FIG. 4 of the drawings. Appropriate ports 102, 103

(FIG. 5) permit the selective introduction/withdrawal of air from the cylinder 101 to move the rods 100 from the position shown in FIG. 5 outwardly and downwardly to the position shown in FIG. 6 during which movement each ejector 95 ejects one of the cotton candy balls B from its associated spindle 70, as is best illustrated comparatively in FIGS. 5 and 6 of the drawings. Obviously, the cotton candy balls B are simultaneously ejected from each of the spindles 70 and after the latter occurs, the rods 100 are retracted from the position shown in FIG. 6 to that shown in FIG. 5 by appropriately introducing and discharging air from the ports 102, 103. The ejection of the cotton candy balls B takes place virtually instantaneously and upon the retraction of the ejectors 95, the sugar streams or floss L again begins to impinge upon the end portions 71 of the spindles 70 to again form additional cotton candy balls B. This process is continuously repeated with the ejected balls B descending by gravity upon discharge means 110 which includes a discharge plate 111 fixed to an annular ring 112 having a radially inwardly directed guide flange 113, a radially outwardly opening circumferential groove 114 and a discharge drive belt 115 entrained in the latter and entrained about pulleys 116, 117 (FIG. 3) rotatable relative to respective shafts 120, 121 fixed to the base plate 15. The flange 113 of the annular ring 112 is guided for rotation in one of four guide rolls 130 (FIGS. 2 and 3). A variable speed motor 124 (FIG. 3) imparts adjustable selective rotation to the shaft 121 to drive the belt 115 which in turn rotates the annular ring 112 via the drive belt 115 causing the discharge plate 111 to rotate counterclockwise, as viewed in FIG. 3 of the drawings. The latter rotation brings the discharged or ejected cotton candy balls B toward a discharge opening 13 1 formed in the tub 50 through which the cotton candy balls B are discharged upon an oscillating table 150 which preferably oscillates in one direction to feed the cotton candy balls B toward a first form and fill machine then in an opposite direction toward another form and fill machine and vice versa in a repetitive manner such that a selected number of the cotton candy balls B are each packaged in and sealed relative to an associated plastic bag (not shown). In order to augment the discharge of the cotton candy balls B through the discharge opening 131, the shaft 120 (FIG. 3) carries a pulley 125 about which is entrained a discharge belt 126. The discharge belt 126 is entrained about another pulley 127 adjustably supported in a conventional manner by an adjustable arm 128. As the discharge plate 111 rotates counterclockwise, as viewed in FIG. 3, each cotton candy ball B is carried to the belt 126 and the direction of movement of the flight (unnumbered) contacted by each ball B propels the same outwardly through the discharge opening 131 of the tub 50, as is most readily apparent from FIGS. 1 and 3 of the drawings.

From the foregoing, it is readily apparent that the cotton candy balls B can be manufactured/produced upon the spindles 70 extremely rapidly and in a highly automated manner. Obviously, higher rates of production are achieved by increasing the temperature in the heating chamber 31 with a corresponding increase in the speed of rotation of the spinning head 36 and the attendant increase in the sugar supply via the sugar supply or feed screw 25. Obviously, the cotton candy balls B will be formed faster and, therefore, the ejecting means 90 will be correspondingly timed, as would be the speed of rotation of the discharge plate 111 of the discharge means 110 through the variable speed motor 124. Obviously, if demand were less than maximum, speeds and feeds could be appropriately decreased to reduce production, but both at relatively low and extremely high production rates, labor is essentially minimal and constitutes no more than machine oversight. By utilizing a continuous sugar supply feed to the sugar reservoir 20 and the use of automated form-and-fill machines at the discharges of the oscillating table 150 (FIG. 1), a single operator could readily oversee and control the output of anywhere from six to a dozen of the machines 10 which reflects extremely low costs production on a per cotton candy ball basis.

The cotton candy ball manufacturing machine is also relatively sanitary from the standpoint of both manufacturing and clean-up. Since the base plate 15, the middle plate 17 and the tub 50 virtually encapsulate the entire cotton ball manufacturing area, whatever might be externally thereof is of little or no consequence, although obviously the manufacturing area should be clean and of low humidity to maintain static discharge and/or the formation of static electricity at a minimum. Thus, only internal cleaning need be considered, and this is relatively a straightforward proposition because preferably the middle plate 17 is hinged at two of its corners (not shown) to the two most adjacent support posts 16. Thus, the plate 17 can be pivoted, together with all of the components it supports, from its horizontal position to its vertical position at which the entire interior of the tub 50 is accessible for cleaning purposes. Obviously, the tub itself can be unfastened by removing the fasteners 55 for further cleansing, particularly to remove the excess floss Fx accumulating within the channel 60 as a by-pass product of the streams of floss or liquid L which pass beyond the spindle 70 and the balls B, as earlier described. The removal of the tub halves 51, 52 also further accesses the discharge plate 110 and the support 40. Thus, all of the latter components can be cleaned rapidly and efficiently, including the spindles 70 upon the removal of the pins 74 thereof via the bayonet slots 75. Thus, quick disassembly and reassembly by simply pivoting the plate 17 to a vertical position or entirely removing the same from atop the support posts 16 achieves quick internal sanitation of the machine 10.

The ease of cleansing the machine 10 can also be augmented by connecting the piston rods 100 to the ejecting plate 91 in a removable fashion, as opposed to the fixed connection shown in FIG. 5 in particular. A removable connection is shown in FIG. 6 which simply includes a threaded end portion 83 of each piston rod 100 threaded into a threaded socket (unnumbered) of a sleeve 84 having a captive spring 85 biasing a keeper 86 in the locked position shown in FIG. 6. The keeper 86 is pivoted by a pivot pin 87 and need be but aligned with the rod 100 against the bias of the spring 85 to be removed outwardly through a hole 89 of the ejecting or ejector plate 91. Thus, when all keepers 86 are in alignment with the associated piston rods 100, the entire annular ejecting plate 91 can be removed, cleaned and replaced after which the keepers 86 are repositioned to the position shown in FIG. 6.

Although a preferred embodiment of the invention has been specifically illustrated and described herein, it is to be understood that minor variations may be made in the apparatus without departing from the spirit and scope of the invention, as defined the appended claims.

I claim:

1. A machine for manufacturing a cotton candy ball comprising a spindle, means for rotating said spindle, means for impinging a stream of heated liquid sugar upon said spindle during the rotation of said spindle by said spindle rotating means thereby forming a cotton candy ball upon said spindle, and means for ejecting a cotton candy ball from said spindle at the position at which the stream impinges upon the spindle to form the cotton candy ball.

2. The cotton candy ball manufacturing machine as defined in claim 1 wherein said means for ejecting a cotton candy ball from said spindle ejects each cotton candy ball in a generally downward direction.

3. The cotton candy ball manufacturing machine as defined in claim 1 wherein said means for ejecting a cotton candy ball from said spindle ejects each cotton candy ball in a generally downward direction while said spindle is rotating.

4. The cotton candy ball manufacturing machine as defined in claim 1 including means for suspendingly supporting said spindle.

5. The cotton candy ball manufacturing machine as defined in claim 1 including means for suspendingly supporting said spindle in a generally vertically depending position.

6. The cotton candy ball manufacturing machine as defined in claim 1 wherein said spindle is rotated by said rotating means about a generally vertically disposed axis and said stream is generally transverse to said vertically disposed spindle axis.

7. The cotton candy ball manufacturing machine as defined in claim 1 wherein said spindle is rotated by said rotating means about a generally vertically disposed axis and said stream is generally normal to said vertically disposed spindle axis.

8. The cotton candy ball manufacturing machine as defined in claim 1 wherein said means for ejecting a cotton candy ball from said spindle ejects each cotton candy ball in a generally downward direction, and means for effecting discharge of the ejected cotton candy ball in a direction generally transverse to an axis of said spindle.

9. The cotton candy ball manufacturing machine as defined in claim 1 means for ejecting a cotton candy ball from said spindle ejects each cotton candy ball in a generally downward direction, and means for effecting discharge of the ejected cotton candy ball in a direction generally normal to an axis of said spindle.

10. The cotton candy ball manufacturing machine as defined in claim 1 including means for creating a liquid sugar from granular sugar including a heating chamber, means for introducing granular sugar into said heating chamber, means for detecting the level of sugar in said heating chamber, and means for controlling the introduction of the granular sugar into said heating chamber in response to said detecting means.

11. The cotton candy ball manufacturing machine as defined in claim 1 including means for creating a liquid sugar from granular sugar including a heating chamber, means for introducing granular sugar into said heating chamber, means for detecting the level of sugar in said heating chamber, means for controlling the introduction of the granular sugar into said heating chamber in response to said detecting means, and said controlling means is a rotatable feed screw.

12. The cotton candy ball manufacturing machine as defined in claim 1 including means for creating a liquid sugar from granular sugar including a heating chamber, means for introducing granular sugar into said heating chamber, means for detecting the level of sugar in said heating chamber, means for controlling the introduction of the granular sugar into said heating chamber in response to said detecting means, and said controlling means is an electric motor driven rotatable feed screw.

13. The cotton candy ball manufacturing machine as defined in claim 1 including a tub externally surrounding said spindle and impinging means, and said tub includes circumferentially disposed reservoir means generally aligned with said impinging means for collecting excess liquid sugar which passes beyond said spindle.

14. The cotton candy ball manufacturing machine as defined in claim 1 wherein said ejecting means includes an ejector associated with each spindle, and means for effecting relative movement between each ejector and its spindle to eject a cotton candy ball therefrom.

15. The cotton candy ball manufacturing machine as defined in claim 1 wherein said ejecting means includes an ejector associated with each spindle, and means for effecting movement of each ejector relative to its spindle to eject a cotton candy ball therefrom.

16. The cotton candy ball manufacturing machine as defined in claim 14 wherein each ejector includes an ejector portion in sliding relationship to its associated spindle.

17. The cotton candy ball manufacturing machine as defined in claim 14 wherein each ejector includes an ejector portion at least partially surrounding and in sliding relationship to its associated spindle.

18. The cotton candy ball manufacturing machine as defined in claim 15 wherein each ejector includes an ejector portion in sliding relationship to its associated spindle.

19. The cotton candy ball manufacturing machine as defined in claim 15 wherein each ejector includes an ejector portion at least partially surrounding and in sliding relationship to its associated spindle.

20. A machine for manufacturing cotton candy balls comprising a plurality of spindles each including an axis, means for rotating each of said spindles about its axis, means for impinging a stream of heated liquid sugar upon said spindles during the rotation of said spindles by said spindles rotating means thereby forming a cotton candy ball upon each spindle, said spindle axes being disposed in generally parallel relationship to each other at a predetermined fixed spatial location relative to each other and to said impinging means, and means for ejecting cotton candy balls from said spindles at said fixed spatial locations.

21. The cotton candy balls manufacturing machine as defined in claim 20 wherein said spindles are in generally surrounding relationship to said impinging means.

22. The cotton candy balls manufacturing machine as defined in claim 20 wherein said spindles are in generally surrounding relationship to said impinging means and are each generally equidistantly spaced therefrom.

23. The cotton candy balls manufacturing machine as defined in claim 20 wherein said spindles are in generally surrounding relationship to said impinging means and are each generally equidistantly spaced therefrom and from each other.

24. The cotton candy balls manufacturing machine as defined in claim 20 including a wall externally surrounding said spindles and impinging means, and said ejecting means eject the cotton candy balls within said wall.

25. The cotton candy balls manufacturing machine as defined in claim 20 wherein said means for ejecting cotton candy balls from said spindles ejects said cotton candy balls in a generally downward direction.

26. The cotton candy balls manufacturing machine as defined in claim 20 wherein said means for ejecting cotton candy balls from said spindles ejects said cotton candy balls in a generally downward direction while said spindles are rotating.

27. The cotton candy balls manufacturing machine as defined in claim 20 including means for suspendingly supporting said spindles.

28. The cotton candy balls manufacturing machine as defined in claim 20 including means for suspendingly supporting said spindles in generally vertically depending positions.

29. The cotton candy balls manufacturing machine as defined in claim 20 wherein said spindle axes are generally vertically disposed, and said stream is generally transverse to said vertically disposed spindle axes.

30. The cotton candy balls manufacturing machine as defined in claim 20 wherein said spindle axes are generally vertically disposed, and said stream is generally normal to said vertically disposed spindle axes.

31. The cotton candy balls manufacturing machine as defined in claim 20 wherein said means for ejecting cotton candy balls from said spindles ejects said cotton candy balls in a generally downward direction, and means for effecting discharge of the ejected cotton candy balls in a direction generally transverse to the spindle axes.

32. The cotton candy balls manufacturing machine as defined in claim 20 wherein said means for ejecting cotton candy balls from said spindles ejects said cotton candy balls in a generally downward direction, and means for effecting discharge of the ejected cotton candy balls in a direction generally normal to the spindle axes.

33. The cotton candy balls manufacturing machine as defined in claim 20 including means for creating liquid sugar from granular sugar including a heating chamber, means for introducing granular sugar into said heating chamber, means for detecting the level of sugar in said heating chamber, and means for controlling the introduction of the granular sugar into said heating chamber in response to said detecting means.

34. The cotton candy balls manufacturing machine as defined in claim 20 including means for creating liquid sugar from granular sugar including a heating chamber, means for introducing granular sugar into said heating chamber, means for detecting the level of sugar in said heating chamber, means for controlling the introduction of the granular sugar into said heating chamber in response to said detecting mean, and said controlling means is a rotatable feed screw.

35. The cotton candy balls manufacturing machine as defined in claim 20 including means for creating liquid sugar from granular sugar including a heating chamber, means for introducing granular sugar into said heating chamber, means for detecting the level of sugar in said heating chamber, means for controlling the introduction of the granular sugar into said heating chamber in response to said detecting means, and said controlling means is an electric motor driven rotatable feed screw.

36. The cotton candy balls manufacturing machine as defined in claim 20 including a tub externally surrounding said spindles and impinging means, and said tub includes circumferentially disposed reservoir means generally aligned with said impinging means for collecting excess liquid sugar which passes beyond said spindle.

37. The cotton candy balls manufacturing machine as defined in claim 21 including a wall externally surrounding said spindles and impinging means, and said ejecting means eject the cotton candy balls within said wall.

38. The cotton candy balls manufacturing machine as defined in claim 21 wherein said means for ejecting cotton candy balls from said spindles ejects said cotton candy balls in a generally downward direction.

39. The cotton candy balls manufacturing machine as defined in claim 21 wherein said means for ejecting cotton candy balls from said spindles ejects said cotton candy balls in a generally downward direction while said spindles are rotating.

40. The cotton candy balls manufacturing machine as defined in claim 21 including means for suspendingly supporting said spindles.

41. The cotton candy balls manufacturing machine as defined in claim 21 including means for suspendingly supporting said spindles in generally vertically depending positions.

42. The cotton candy balls manufacturing machine as defined in claim 21 wherein said spindle axes are generally vertically disposed, and said stream direction is generally transverse to said vertically disposed spindle axes.

43. The cotton candy balls manufacturing machine as defined in claim 21 including a tub externally surrounding said spindles and impinging means, and said tub includes circumferentially disposed reservoir means generally aligned with said impinging means for collecting excess liquid sugar which passes beyond said spindle.

44. The cotton candy balls manufacturing machine as defined in claim 22 wherein said means for ejecting cotton candy balls from said spindles ejects said cotton candy balls in a generally downward direction.

45. The cotton candy balls manufacturing machine as defined in claim 22 wherein said means for ejecting cotton candy balls from said spindles ejects said cotton candy balls in a generally downward direction while said spindles are rotating.

46. The cotton candy balls manufacturing machine as defined in claim 22 including means for suspendingly supporting said spindles.

47. The cotton candy balls manufacturing machine as defined in claim 22 including means for suspendingly supporting said spindles in generally vertically depending positions.

48. The cotton candy balls manufacturing machine as defined in claim 22 wherein said spindle axes are generally vertically disposed, and said stream direction is generally transverse to said vertically disposed spindle axes.

49. The cotton candy balls manufacturing machine as defined in claim 22 including a tub externally surrounding said spindles and impinging means, and said tub includes circumferentially disposed reservoir means generally aligned with said impinging means for collecting excess liquid sugar which passes beyond said spindle.

50. The cotton candy ball manufacturing machine as defined in claim 20 wherein said ejecting means includes an ejector associated with each spindle, and means for effecting relative movement between each ejector and its spindle to eject a cotton candy ball therefrom.

51. The cotton candy ball manufacturing machine as defined in claim 20 wherein said ejecting means includes an ejector associated with each spindle, and means for effecting movement of each ejector relative to its spindle to eject a cotton candy ball therefrom.

52. The cotton candy ball manufacturing machine as defined in claim 50 wherein each ejector includes an ejector portion in sliding relationship to its associated spindle.

53. The cotton candy ball manufacturing machine as defined in claim 50 wherein each ejector includes an ejector portion at least partially surrounding and in sliding relationship to its associated spindle.

\* \* \* \* \*